3,146,487
DOOR HINGES WITH FRICTION TYPE HOLD-OPEN MEANS

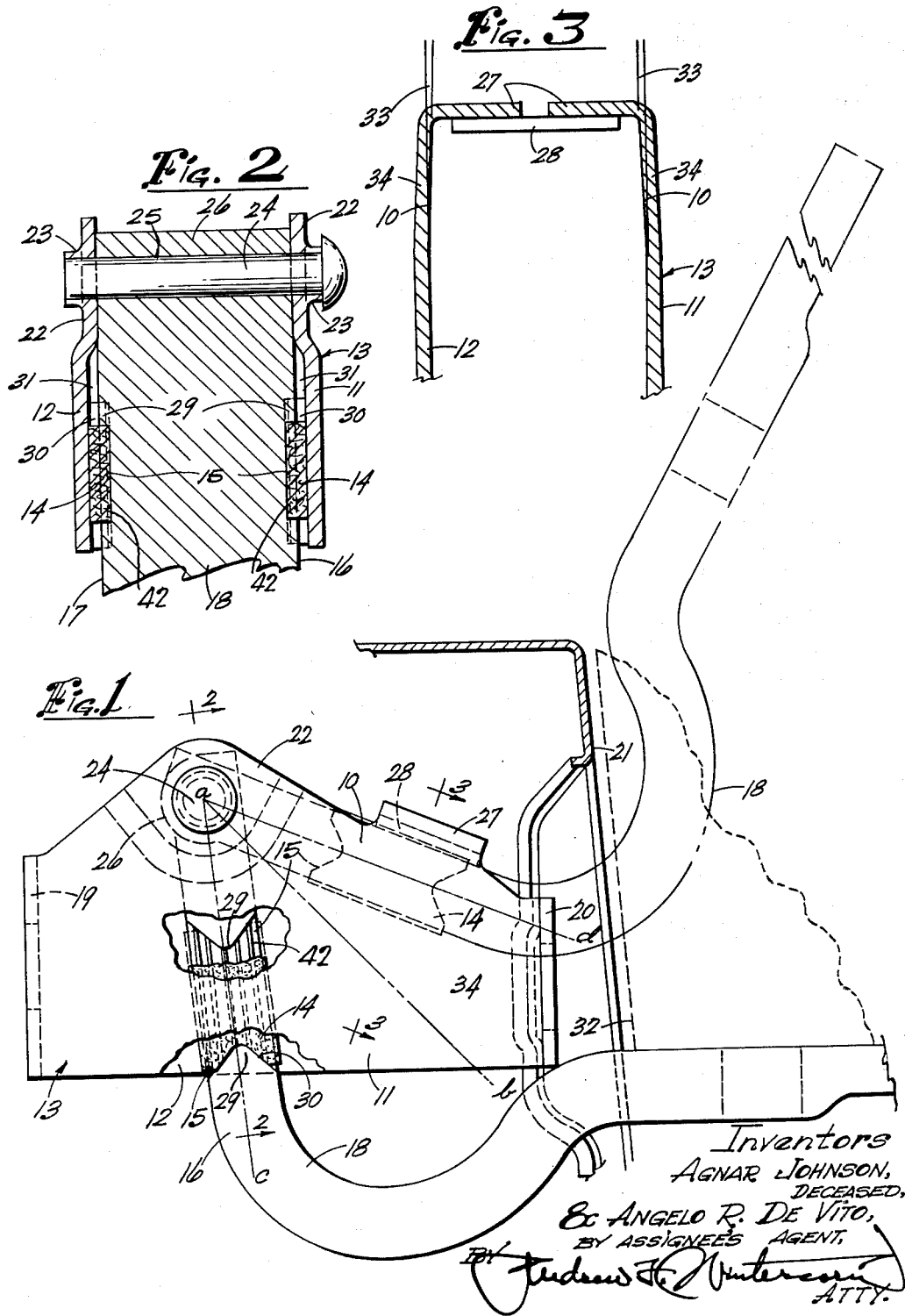

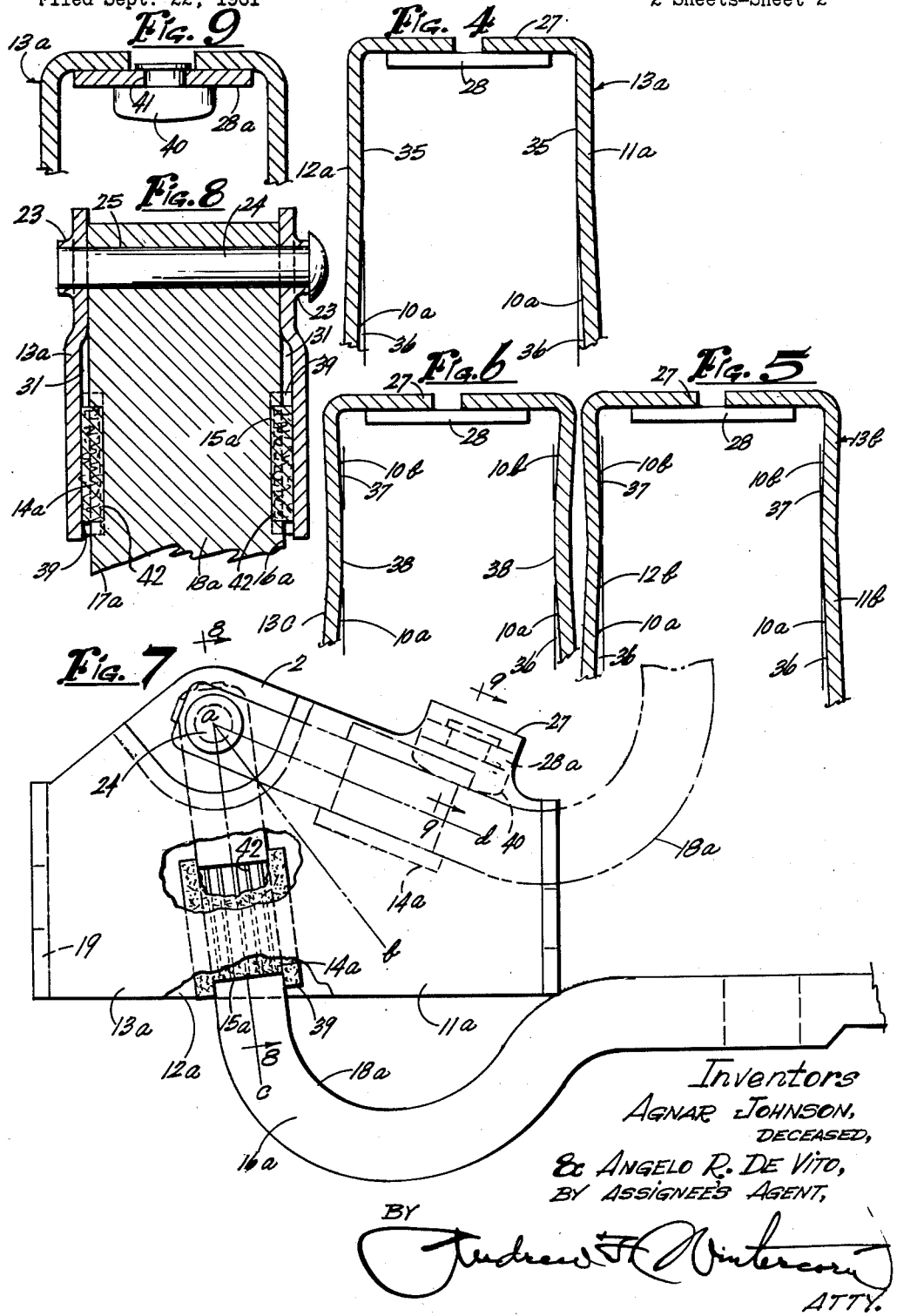

Agnar Johnson, deceased, late of Rockford, Ill., by Oliver Nelson, administrator, Rockford, Ill., and Angelo R. De Vito, Rockford, Ill., assignors, by mesne assignments, to L. W. Menzimer, trustee, Rockford, Ill.
Filed Sept. 22, 1961, Ser. No. 169,159
12 Claims. (Cl. 16—140)

This invention relates to automobile door hinges and is more particularly concerned with improvements in friction type hold-open means therefor.

The principal object of our invention is to provide a simple, economical, and thoroughly practical friction type hold-open means for a cage type hinge wherein flat strips or pads of wear resistant friction material similar to what is commonly used for brake linings are mounted on the faces of the longitudinal edges of the inner or goose-neck hinge member in the maximum spaced relationship to the pintle consistent with their operation inside the cage throughout the range of door opening and closing movement, the opposed top and bottom walls of the cage having ramps defined thereon to provide a predetermined amount of friction drag in different positions of the inner hinge member. Thus, for example:

(1) In one form, the inner hinge member swings freely in opening to mid-position when the pads encounter the ramps and there is gradually increased frictional drag from that point on to the fully opened position;

(2) In a second form, the pads run up ramps in the opening movement to mid-position where the friction drag is a maximum, and beyond that point, the frictional drag is maintained constant;

(3) In the third form, the pads run up ramps in the opening movement to mid-position where the friction drag is a maximum, and from that point on to fully open position, the pads run down ramps; and (4) The fourth form is a combination of the second and third forms in which there is a levelling off at the mid-position to maintain maximum friction drag throughout a predetermined angularity.

The invention is illustrated in the accompanying drawings in which—

FIG. 1 is a plan view of a hinge made in accordance with our invention;

FIG. 2 is a section detail on the line 2—2 of FIG. 1;

FIG. 3 is a section detail on the line 3—3 of FIG. 1 illustrating the ramps;

FIGS. 4, 5 and 6 are views similar to FIG. 3 showing three other arrangements of ramps;

FIG. 7 is a plan view like FIG. 1 showing another hinge embodying a related construction made in accordance with our invention, this view serving incidentally to illustrate the ramp of FIG. 4;

FIG. 8 is a sectional detail on the line 8—8 of FIG. 7; and

FIG. 9 is a sectional detail on the line 9—9 of FIG. 7.

Similar reference numerals are applied to corresponding parts in the views.

Referring first to FIGS. 1 to 3, the automobile door hinge shown is of the well known concealed or cage type, similar, for example, to that shown in Agnar Johnson's Patent No. 2,707,302, issued May 3, 1955, except for the ramp portions 10 provided on portions of the top and bottom walls 11 and 12 respectively of the outer or cage member 13 of the hinge, to cooperate with the pads or strips 14 of friction material that are set in recesses 15 coined in the longitudinal top and bottom edges 16 and 17 of the inner or goose-neck hinge member 18.

The horizontal top and bottom walls 11 and 12 are interconnected by a substantially vertical wall 19 opposite the attaching flanges 20 by means of which the cage member is fastened to the door pillar 21 in the usual way. Inwardly embossed portions 22 are perforated and swedged as at 23 to mount the pintle 24, which is entered in a bearing hole 25 provided therefor in the enlarged end portion 26 of the inner hinge member 18. Lugs 27 are shown projecting toward one another from the edges of the top and bottom walls 11 and 12, and these lugs are welded to the opposite ends of the plate 28, which serves both as a brace for the outer hinge member 13 and as a stop or limiting abutment for the gooseneck end of the inner hinge member 18 in the fully opened position of the door, as indicated by the dot and dash line showing in FIG. 1. The top and bottom walls 11 and 12 respectively, are substantially parallel from the wall 19 to the line a–b, and the pads 14, which are retained against displacement from the recesses 15 by the V-shaped end portions 29 of the recesses engaging in the notches 30 provided therefor in the ends of the pads, are thick enough to take up the spaces 31 left between walls 11 and 12 of the outer hinge member and the top and bottom longitudinal edges of the inner hinge member and allow free swinging of the door 32 from closed position, namely, line a–c, approximately to its mid-open position, namely, line a–b. The ramps 10 converge at the small angle indicated at 33 in FIG. 3 so that in the further opening movement of the door from the mid-position indicated by the line a–b to the fully open position indicated by the line a–d, the door has gradually increasing frictional drag imposed upon the movement thereof by reason of the compression of the pads 14 and a certain amount of springing outwardly of the portions 34 of the walls 11 and 12 incident to this compression. The opposed relationship of pads 14 and of ramps 10 is important, because it results in evenly balanced pressures on the hinge member 18 from above and below in the breaking action described, so that the hinge will not be subject to any increased wear on the pintle 24 and bearing 25, and the outer or cage member 13, being subject to balanced deflection of its top and bottom walls 11 and 12, is not so apt to get bent out of shape, especially since only half as much deflection on either wall is needed to obtain a given braking pressure than would be required if only one wall was deflected.

In operation, the present hinge is tailored to fit modern driving conditions, from the standpoint that the friction hold-open means provided is designed to be effective only at and beyond the mid-open position of the door, the reason for this being that the door in most cases is not opened more than half way, as for example, in a garage or in a parking lot, and in that kind of operation the average driver prefers having the door swing freely, there being usually no need for any hold-open action in that range. In other situations where the door is opened farther, the present hold-open means provides gradually increasing frictional resistance in the movement from the line a–b, which is the mid-open position, to the line a–d, the fully opened position. Thus, assuming the door has been swung to mid-open position and the operator desires to hold it there, he or she need only open the door a little wider and the friction type hold-open means 10–14 functions to hold it open. In the event the car is inclined sidewise in the direction of and tending to cause the door to swing closed by gravity, it will under those circumstances then be necessary to swing the door farther open to obtain friction drag to hold it open.

Variatons of the ramp arrangement of FIG. 3 illustrated in FIGS. 4, 5 and 6 are as follows:

(1) In FIG. 4, the ramps 10a are between the closed position indicated by line *a–c* in FIG. 7 to the mid-open position indicated by line *a–b* in FIG. 7 so that the maximum hold-open friction drag is obtained at the mid-open position and from that point to the fully opened position of line *a–d* of FIG. 7, the maximum friction drag is maintained constant by having the inner surfaces 35 of the top and bottom walls 11a and 12a, respectively, of the outer hinge member 13a substantially parallel. The acute angle of the ramps 10a—10a indicated at 36 is approximately the same as the acute angle indicated at 33 in FIG. 3. The operation of this form should be clear from the description of the operation of FIGS. 1 to 3, namely, that a certain amount of hold-open action is obtained from the commencement of the door opening movement and it gradually increases up to the mid-open position where it is a maximum and this maximum hold-open friction is maintained constant from that mid-open position to the fully open position.

(2) In FIG. 5, the ramps 10a correspond to the ramps 10a of FIG. 4 and extend from the closed position of line *a–c*, FIG. 1, to the mid-open position of line *a–b* of FIG. 1, but from that point to the fully open position of line *a–d* of FIG. 1, the ramps 10b diverge as indicated by the acute angles 37 so as to give gradually decreasing frictional drag. The operation of this form should be clear from the description of FIG. 4, namely, that there is gradually increasing frictional drag from the commencement of door opening movement to the mid-open position where the friction drag is a maximum, but instead of being maintained constant from that point to the fully opened position of line *a–d*, it is gradually reduced with this form, making the door fairly free at the extreme open position, so that there is less difficulty in starting to swing it closed.

(3) In FIG. 6, which is a combination of FIGS. 4 and 5, the ramps 10a and 10b are shortened in order to provide parallel dwells 38 at the mid-open position line *a–b*, FIG. 1, comparable to the dwells 35 of FIG. 4. The operation of this form should be clear from the description of FIGS. 4 and 5, namely, that there is gradually increased frictional drag in the door opening movement up to the mid-open position, line *a–b*, FIG. 1, where the friction drag is a maximum, but in this form the maximum friction drag is sustained throughout a given angularity of door movement and thereafter the friction drag is gradually diminished again as in FIG. 5 toward the fully opened position.

The other hinge shown in FIGS. 7 to 9 is similar to that shown in FIGS. 1 to 3, but the pads 14a of friction brake material are substantially H-shaped and the recesses 15a coined in the opposed longitudinal edges 16a and 17a of the inner hinge member 18a are a rectangular form relying on the projecting end portions 39 on the pads to prevent displacement of the pads from the inner hinge member 18a. The operation otherwise is the same as in FIG. 1, depending, of course, on which one of the four ramp arrangements of FIGS. 3, 4, 5 and 6 is used. In this hinge the plate 28a provides a mounting for the rubber bumper pad 40 in the hole 41 to cushion the door in the event it is swung open violently.

In both hinges shown the friction pads 14 and 14a are shown disposed at the maximum radius from the pintle 24 consistent with operation of the pads in contact with the top and bottom walls of the outer cage member, with a view to having the friction drag means operate to the maximum mechanical advantage, and it is conceivable therefore that in some cases the cage may be designed so as to permit increasing the radial spacing of the pads from the pintle.

In both hinges, there are spaced parallel ribs 42 coined in the bottom of the recesses 15 and 15a in the one coining operation, the ribs extending lengthwise of the recesses as shown. In the first door opening movement these ribs get impressed into the pads 14 and 14a, respectively, in the initial compression thereof and serve to anchor the pads permanently in place, making it unnecessary to rely on any cementing or other fastening means. With this addition of the ribs, the notches at 30 in FIG. 1 and the projections 39 in FIG. 7 are useful mainly, therefore, in holding the pads against displacement until the ribs 42 get fully impressed into the pads to anchor the same.

It is believed the foregoing description conveys a good understanding of the objects and advantages of our invention. The appended claims have been drawn to cover all legitimate modifications and adaptations.

We claim:

1. In combination, a hinge comprising a generally U-shaped outer member, and an inner member having an end portion pivoted on a pintle disposed at right angles to and supported on the arms of said U-shaped outer member, said inner hinge member having parallel top and bottom edge faces, one of which is in a predetermined spaced parallel relationship to an adjacent arm of said outer hinge member, and friction type hold-open means for frictionally resisting pivotal movement of the inner member with respect to the outer member comprising a flat friction pad mounted on and projecting from the aforesaid one edge face of the inner hinge member, and a friction braking surface defined on the inner side of the adjacent arm of the said outer hinge member including a portion thereof inclined at an acute angle relative to the plane of movement of the pad positioned to be engaged by said pad as the door swings in opening movement with sliding frictional face to face engagement only, and of continuously applied tension to hold the door in various selected open positions.

2. In combination, a hinge comprising a generally U-shaped outer member, and an inner member having an end portion pivoted on a pintle disposed at right angles to and supported on the arms of said U-shaped outer member, said inner hinge member having parallel top and bottom edge faces in spaced parallel relationship to the adjacent arms of said outer hinge member, and friction type hold-open means for frictionally resisting pivotal movement of the inner member with respect to the outer member comprising flat friction pads mounted in opposed relation on and projecting from the top and bottom edge faces of the inner hinge member, and friction braking surfaces defined in opposed relation on the inner sides of the adjacent arms of the said outer hinge member including portions thereof inclined at an acute angle relative to the planes of movement of the pads positioned to be slidably engaged by said pads, whereby the braking action is applied to the inner hinge member in substantially balanced relationship to the opposite ends of the pintle for reduced wear on the hinge and giving continuous and gradually increasing tension to resist swinging of the inner hinge member.

3. A hinge structure as set forth in claim 1 wherein the pad supporting edge face of the inner hinge member has a shollow recess provided therein to accommodate the pad, the bottom of said recess having a plurality of projections provided thereon which are impressed into the softer material of the pad to anchor the same mechanically against displacement from the inner hinge member.

4. A hinge structure as set forth in claim 1, wherein the inclined friction braking surface defined on the inner side of the adjacent arm of the outer member is so inclined in relation to the plane of movement of the pad that the pad slides upwardly thereon with gradually increasing frictional resistance.

5. A hinge structure as set forth in claim 1, wherein the inclined friction braking surface defined on the inner side of the adjacent arm of the outer member is so inclined in relation to the plane of movement of the pad that the pad slides upwardly thereon with gradually increasing frictional resistance, and wherein another braking surface is provided on said outer member that is parallel with the plane of movement of the friction pad along which the friction pad moves in face to face contact with the substantially constant and maximum frictional resistance.

6. A hinge structure as set forth in claim 1, wherein the inclined friction braking surface defined on the inner side of the adjacent arm of the outer member is so inclined in relation to the plane of movement of the pad that the pad slides upwardly thereon with gradually increasing frictional resistance and wherein another braking surface is provided on said outer member extending from one end of the last named surface inclined in the reverse direction along which the pad slides with gradually decreasing frictional resistance.

7. A hinge structure as set forth in claim 1, wherein the inclined friction braking surface defined on the inner side of the adjacent arm of the outer member is so inclined in relation to the plane of movement of the pad that the pad slides upwardly thereon with gradually increasing frictional resistance and wherein another braking surface is provided on said outer member extending from one end of the last named surface inclined in the reverse direction along which the pad slides with gradually decreasing frictional resistance, the outer hinge member having another braking surface thereon between the two inclined braking surfaces that is parallel with the plane of movement of the pad along which the pad slides with substantially constant and maximum frictional resistance through a predetermined angularity intermediate closed and opened positions of the inner hinge member.

8. A hinge for an automobile door and the like, comprising a mounting plate for attachment to the door frame and a supporting plate extending therefrom substantially normal thereto, a swinging hinge member mounted on said supporting plate and having a friction pad thereon, said supporting plate being of a springable resilient material and having an inclined braking ramp formation thereon commencing at about the half open position of said swinging hinge member for sliding frictional engagement by a friction pad that extends from an edge face of the swinging hinge member yieldingly to hold said swinging hinge member in various selected positions by the resulting gradually increasing and continuously applied frictional braking effect between the pad and the inclined ramp.

9. A hinge for an automobile door and the like, comprising a mounting plate for attachment to the door frame and a supporting plate extending therefrom substantially normal thereto, a swinging hinge member mounted on said supporting plate and having a friction pad thereon, said supporting plate being of a springable resilient material and having an inclined braking ramp formation thereon ending at about the half open position of said swinging hinge member for sliding frictional engagement by a friction pad that extends from an edge face of the swinging hinge member yieldingly to hold said swinging hinge member in various selected positions intermediate closed and half open positions by the resulting gradually increasing and continuously applied frictional braking effect between the pad and the inclined ramp, said supporting plate beyond the half open position of said swinging hinge member being disposed substantially parallel to the plane of movement of said pad to hold said swinging hinge member in various selected positions intermediate half open and fully opened positions with substantially constant and maximum frictional resistance.

10. A hinge for an automobile door and the like, comprising a mounting plate for attachment to the door frame and a supporting plate extending therefrom substantially normal thereto, a swinging hinge member mounted on said supporting plate and having a friction pad thereon, said supporting plate being of a springable resilient material and having an inclined braking ramp formation thereon ending at about the half open position of said swinging hinge member for sliding frictional engagement by a friction pad that extends from an edge face of the swinging hinge member yieldingly to hold said swinging hinge member in various selected positions intermediate closed and half open positions by the resulting gradually increasing and continuously applied frictional braking effect between the pad and the inclined ramp, said supporting plate beyond the half open position of said swinging hinge member having an oppositely inclined braking ramp formation thereon for sliding frictional engagement by said friction pad yieldingly to hold said swinging hinge member in various selected positions intermediate half opened and fully opened positions by the resulting gradually decreasing and continuously applied frictional braking effect between the pad and the inclined ramp.

11. A hinge for an automobile door and the like, comprising a mounting plate for attachment to the door frame and a supporting plate extending therefrom substantially normal thereto, a swinging hinge member mounted on said supporting plate and having a friction pad thereon, said supporting plate being of a springable resilient material and having an inclined braking ramp formation thereon ending at about the half open position of said swinging hinge member for sliding frictional engagement by a friction pad that extends from an edge face of the swinging hinge member yieldingly to hold said swinging hinge member in various selected positions intermediate closed and half open positions by the resulting gradually increasing and continuously applied frictional braking effect between the pad and the inclined ramp, said supporting plate beyond the half open position of said swinging hinge member having an oppositely inclined braking ramp formation thereon for sliding frictional engagement by said friction pad yieldingly to hold said swinging hinge member in various selected positions intermediate half opened and fully opened positions by the resulting gradually decreasing and continuously applied frictional braking effect between the pad and the inclined ramp, said supporting plate having a portion at the half open position of said swinging hinge member that is parallel with the plane of movement of said friction pad yieldingly to hold said swinging hinge member in various selected positions at about the half open position of said swinging hinge member with substantially constant and maximum frictional resistance.

12. A hinge structure as set forth in claim 2 wherein each of the pad supporting edge faces of the inner hinge member has a shallow recess provided therein to accommodate the pad, the bottom of each of said recesses having a plurality of projections provided thereon which are impressed into the softer material of the pad to anchor the same mechanically against displacement from the inner hinge member.

References Cited in the file of this patent

UNITED STATES PATENTS

| | | |
|---|---|---|
| 2,034,905 | Jacobs | Mar. 24, 1936 |
| 2,342,531 | Dean | Feb. 22, 1944 |
| 2,354,789 | Atwood | Aug. 1, 1944 |
| 2,364,437 | Gessler | Dec. 5, 1944 |
| 2,651,805 | Laible | Sept. 15, 1953 |
| 2,799,889 | Ragsdale | July 23, 1957 |
| 2,841,815 | Kallstrom et al. | July 8, 1958 |
| 2,962,751 | Dozois et al. | Dec. 6, 1960 |